(12) United States Patent
Gao et al.

(10) Patent No.: US 9,353,864 B2
(45) Date of Patent: May 31, 2016

(54) OIL RING FOR INTERNAL COMBUSTION ENGINE

(75) Inventors: Yunzhi Gao, Saitama (JP); Junichi Takahashi, Saitama (JP); Gyo Muramatsu, Niigata (JP); Ryo Obara, Niigata (JP); Tetsuji Miyashita, Niigata (JP); Tadahiko Watanabe, Niigata (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 43 days.

(21) Appl. No.: 13/500,223

(22) PCT Filed: Oct. 6, 2010

(86) PCT No.: PCT/JP2010/067521
§ 371 (c)(1),
(2), (4) Date: May 31, 2012

(87) PCT Pub. No.: WO2011/043364
PCT Pub. Date: Apr. 14, 2011

(65) Prior Publication Data
US 2012/0235359 A1 Sep. 20, 2012

(30) Foreign Application Priority Data
Oct. 6, 2009 (JP) ................................. 2009-232324

(51) Int. Cl.
*F16J 9/26* (2006.01)
*F16J 9/20* (2006.01)

(52) U.S. Cl.
CPC ....................................... *F16J 9/203* (2013.01)

(58) Field of Classification Search
CPC ............. F16J 9/26; F16J 9/203; F16J 15/441; F16J 15/442; F16J 15/443; F16J 15/3288
USPC .......... 277/440–444, 422; 427/436–437, 567, 427/253, 251, 252
See application file for complete search history.

(56) References Cited

U.S. PATENT DOCUMENTS 3,281,156 A * 10/1966 Anderson et al. ............. 277/463
3,771,801 A * 11/1973 Burke ............................ 277/584
(Continued)

FOREIGN PATENT DOCUMENTS

JP          9-42451 A    2/1997
JP       10-157013 A    6/1998
(Continued)

OTHER PUBLICATIONS

International Search Report for PCT/JP2010/067521 dated Dec. 14, 2010.

*Primary Examiner* — Kristina Fulton
*Assistant Examiner* — Nathan Cumar
(74) *Attorney, Agent, or Firm* — Kenealy Vaidya LLP

(57) ABSTRACT

An oil ring for an internal combustion engine is provided that can prevent adhesion and deposition of oil sludge even during long-time operation of the engine, can thereby prevent the occurrence of sticking of the oil ring components to each other, and can maintain a good oil control function. At least part of the surface of the oil ring for an internal combustion engine is coated with a metal coating having a surface free energy of 40 mJ/m² or less and a hydrogen bonding strength of 1.0 mJ/m² or less. A coating of Ni, Cu, or an alloy containing Ni or Cu is used as the metal coating.

1 Claim, 2 Drawing Sheets

(56) References Cited

U.S. PATENT DOCUMENTS

| | | | |
|---|---|---|---|
| 5,469,616 A | * | 11/1995 | Miyazaki et al. ........ 29/888.074 |
| 5,564,699 A | * | 10/1996 | Lawrence et al. ............. 277/497 |
| 2005/0181174 A1 | * | 8/2005 | Weerasinghe et al. ........ 428/141 |
| 2006/0113730 A1 | * | 6/2006 | Suzuki et al. ................. 277/434 |
| 2008/0053396 A1 | * | 3/2008 | Hiraishi et al. ............ 123/193.2 |
| 2009/0058014 A1 | * | 3/2009 | Kariya et al. ................. 277/442 |

FOREIGN PATENT DOCUMENTS

| | | | | |
|---|---|---|---|---|
| JP | 2000 027995 | * | 1/2000 | |
| JP | 2000 27995 | * | 1/2000 | ................ F16J 9/26 |
| JP | 2000-27995 A | | 1/2000 | |
| JP | 2000 027995 MT | * | 1/2000 | |
| JP | 2000 027995 wT | * | 1/2000 | |
| JP | 2006-291884 A | | 10/2006 | |
| JP | 2008-57478 A | | 3/2008 | |

\* cited by examiner

OIL RING FOR INTERNAL COMBUSTION ENGINE

This application is a U.S. national phase filing under 35 U.S.C. §371 of PCT Application No. PCT/JP2010/067521, filed Oct. 6, 2010, and claims priority under 35 U.S.C. §119 to Japanese patent application no. 2009-232324, filed Oct. 6, 2009, the entireties of both of which are incorporated by reference herein.

TECHNICAL FIELD

The presently disclosed subject matter relates to an oil ring for an internal combustion engine and more particularly to an oil ring for an internal combustion engine that can effectively prevent adhesion and deposition of oil sludge generated by deterioration of lubricating oil for the engine and sticking of the oil ring components caused by the adhesion and deposition of the oil sludge.

BACKGROUND TECHNOLOGY

In an internal combustion engine, lubricating oil is heated and exposed to blowby gas during long-time operation of the engine, and unburned products of hydrocarbons and denatured products of oil additives are contained in the lubricating oil. In a diesel engine, carbon particulates are also contained in lubricating oil. These unburned products, denatured products of oil additives, and carbon particulates are generally collectively referred to as "oil sludge." If such oil sludge adheres to components of an engine and is then deposited thereon, these components may be worn, and passages of the lubricating oil may be clogged, so that the functions of the engine components such as oil rings may be hindered.

Referring now to FIGS. 1 and 2, the above problem in the structures of two typical oil rings will be described in more detail.

FIG. 1 shows a cross-section of a part (the right half) of a coil spring loaded oil control ring 1 (a two-piece oil ring). The two-piece oil ring 1 includes: an annular oil ring body 4 having an end gap and composed of a pair of axially disposed upper and lower rail portions 2 and a web 3 connecting the rail portions 2; and a coil expander 5 that presses the oil ring body 4 outwardly in its radial direction. An inner peripheral groove 6 is formed on the inner peripheral side of the oil ring body 4, and an outer peripheral groove 8 is formed on the outer peripheral side. Oil drainage passages 7 spaced apart at predetermined circumferential intervals are formed in the web 3 and pass radially therethrough.

In such a two-piece oil ring 1, oil sludge is deposited on the outer peripheral surface of the coil expander 5, between the pitches thereof, and on the inner peripheral groove 6 of the oil ring body 4. This may cause the passages of the lubricating oil to be clogged. The oil sludge is also deposited on the oil drainage passages 7 and the outer peripheral groove 8, and the oil drainage passages 7 may thereby be clogged. If the passages of the lubricating oil such as the oil drainage passages 7 are clogged, the function of controlling the oil is hindered, and the consumption of the lubricating oil may increase. If the oil sludge is deposited between the pitches of the coil expander 5, the elasticity of the coil expander 5 may be lost. In particular, when a low-tension coil expander 5 is used, the force of pressing the oil ring body 4 against the inner wall surface of a cylinder is reduced due to the oil sludge deposited between the pitches of the coil expander 5, and the conformability of the two-piece oil ring 1 to the cylinder wall surface may be reduced.

FIG. 2 shows a cross-section of a part (the right half) of an expander/segment oil control ring 10 (a three-piece oil ring). This three-piece oil ring 10 includes a pair of annular side rails 11 having end gaps and a spacer expander 12 that supports the side rails 11. Tabs 13 are provided on the inner peripheral side of the spacer expander 12, and outer protruding portions 16 that support the side rails 11 are provided on the outer peripheral side. Flat base dents 14 are provided in sections connecting the tabs 13 and the outer protruding portions 16.

When the spacer expander 12 is combined with the side rails 11, spaces 15 surrounded by the tabs 13, the outer protruding portions 16, the base dents 14, and the side rails 11 are formed. In the three-piece oil ring 10, the side rails 11 are pressed by radial and axial component forces caused by the angles of the tabs 13 of the spacer expander 12, thereby exerting a sealing function on the wall surface of a cylinder and on the upper and lower surfaces of a ring groove. In particular, a narrow-width three-piece oil ring having a narrow axial width, i.e., a reduced dimension $h_1$, has good conformability to the cylinder wall surface and also has a side sealing function. Therefore, even when the tension of this oil ring is small, friction loss can be reduced without an increase in oil consumption. However, even in such a three-piece oil ring 10, oil sludge is more likely to be deposited in the spaces 15 surrounded by the side rails 11 and the base dents 14 on the outer peripheral side of the tabs 13 of the spacer expander 12. In particular, when the axial width of the three-piece oil ring is made small, the deposition of oil sludge may cause sticking of the side rails 11 to the spacer expander 12. In this case, the conformability of the side rails 11 to the inner peripheral surface of the cylinder is lowered, and the oil consumption is likely to increase.

To prevent the above-described adhesion and deposition of oil sludge onto an oil ring, in some conventional methods, liquid repellent treatment (for example, a fluorine-containing coating) is used. More specifically, an oil repellent coating is formed on the surface of the oil ring to prevent adhesion of oil sludge in lubricating oil. Examples of the material for the fluorine-containing coating used for the oil repellent treatment include polytetrafluoroethylene and fluoro alkylsilane. For example, Patent Document 1 proposes a method of forming a liquid repellent film by a sol-gel method using a metal alkoxide and a fluoroalkyl group-substituted metal alkoxide produced by substituting a fluoroalkyl group for a part of the alkoxy group (alkoxyl group) in the metal alkoxide. It is known that a material containing a fluoroalkyl group has water repellency and oil repellency. Therefore, by providing a coating film having fluoroalkyl groups on its surface, liquid repellency is imparted to engine components to prevent adhesion and deposition of oil sludge. Patent Document 2 discloses a technique for improving the effect of preventing adhesion and deposition of oil sludge by using a fluorine-containing coating having an increased thickness. To increase the thickness of the coating, the polymerization of a fluoroalkyl group-substituted alkoxide is promoted before a coating solution is applied to a substrate.

Patent Document 3 describes that, when components of an internal combustion engine are coated with a carbon-based film having a predetermined surface free energy and a predetermined coating roughness, repellency to deposits (oil sludge) is improved. Therefore, deposition of the deposits and sticking are suppressed, and efficient combustion operation is maintained with small performance degradation. Polypropylene resins, perfluoroethylene propylene (FEP) resins, polytetrafluoroethylene (PTFE), fluoro alkylsilanes, and the like are exemplified as the carbon-based film.

As described above, to prevent adhesion and deposition of oil sludge, the use of oil repellent treatment of the surface of an oil ring using, for example, a fluorine-containing thin film has been contemplated. However, since an engine in operation is exposed to high temperature, it has been found that the fluorine-containing thin film is thermally decomposed during long-time operation, so that the effect of preventing adhesion and deposition of oil sludge is reduced. The fluorine-containing thin film may eventually disappear, and the effect of preventing adhesion and deposition may thereby be lost. Therefore, at present, an oil ring for an internal combustion engine has not been obtained which has a high heat resistant coating capable of maintaining the effect of preventing adhesion and deposition of oil sludge even during long-time operation.

[Patent Document 1] Japanese Patent Application Laid-Open No. 2000-27995
[Patent Document 2] Japanese Patent Application Laid-Open No. Hei. 10-157013
[Patent Document 3] Japanese Patent Application Laid-Open No. 2006-291884

DETAILED DESCRIPTION OF EXEMPLARY EMBODIMENTS

According to one aspect of the presently disclosed subject matter, an oil ring for an internal combustion engine can be provided that can prevent adhesion and deposition of oil sludge even during long-time operation of the engine, and can thereby prevent the occurrence of sticking of the oil ring components to each other, and can maintain a good oil control function.

The present inventors have conducted extensive studies and found that, because the adhesive force of oil sludge to a metal coating having a low surface free energy and a low hydrogen bonding strength is very low, the use of such a metal coating to coat the surface of an oil ring allows a high effect of preventing adhesion and deposition of the oil sludge to be maintained even during long-time operation. Accordingly, the inventors have arrived at the presently disclosed subject matter.

More specifically, an oil ring of the presently disclosed subject matter can include an oil ring for an internal combustion engine, in which at least part of the surface of the oil ring is coated with a metal coating having a surface with a surface free energy at 60° C. of 40 mJ/m$^2$ or less and a hydrogen bonding strength at 60° C. of 1.0 mJ/m$^2$ or less.

In an embodiment of the presently disclosed subject matter, the surface of the oil ring for an internal combustion engine is coated with a metal coating having a low surface free energy and a low hydrogen bonding strength. This can significantly reduce the adhesion force of oil sludge to the surface of the oil ring. The adhesion of the oil sludge is thereby suppressed, and deposition of the oil sludge subsequent to the adhesion can also be suppressed. Accordingly, the occurrence of sticking of the oil ring components to each other can be effectively prevented. In addition, the metal coating used has good heat resistance. Therefore, even during long-time operation, the coating is not decomposed or degraded, and the effect of preventing adhesion and deposition of oil sludge is achieved. Accordingly, an oil ring of the presently disclosed subject matter can maintain a good oil control function for a long time.

Examples of an oil ring for an internal combustion engine of the presently disclosed subject matter will now be described in detail.

A metal coating that covers the surface of an oil ring for an internal combustion engine of the presently disclosed subject matter has a surface free energy at 60° C. of 40 mJ/m$^2$ or less and a hydrogen bonding strength at 60° C. of 1.0 mJ/m$^2$ or less. No particular limitation is imposed on the material for the metal coating so long as the above physical properties fall within the above ranges.

Specific examples of the metal material that can form the metal coating include Ni, Cu, and alloys containing Ni or Cu.

No particular limitation is imposed on the method of forming the coating. Any of electroplating, electroless plating, CVD (chemical vapor deposition), sputtering, and the like is used. Of these, electroplating can be beneficial to efficiently coat, with the metal coating, components having complicated shapes, such as a spacer expander, a coil expander, and an oil ring body of an oil ring for an internal combustion engine.

(Measurement of Surface Free Energy and Hydrogen Bonding Strength)

The surface free energy and hydrogen bonding strength of the metal coating can be measured by the following method.

(1) A target specimen is measured for the contact angles with distilled water, ethylene glycol, and 1-bromonaphthalene using an automatic contact angle meter (prop Master 500, product of Kyowa Interface Science Co., Ltd.). During the measurement, the measurement specimen is secured to an aluminum-made hot stage equipped with a heater, and the temperature of the specimen surface is measured by a thermocouple and adjusted to 60±2° C.

(2) The surface free energy and hydrogen bonding strength can be determined from the measured contact angles using surface free energy analysis add-in software (FAMAS) a product of Kyowa Interface Science Co., Ltd., according to the Young-Dupre equation.

An example of the metal coating in the presently disclosed subject matter has a surface free energy at 60° C. of 40 mJ/m$^2$ or less and a hydrogen bonding strength at 60° C. of 1.0 mJ/m$^2$ or less as measured by the above measurement method.

The thickness of the metal coating in the presently disclosed subject matter can be 0.1 µm to 10 µm. When the thickness of the metal coating is 0.1 µm or more, the surface free energy and hydrogen bonding strength are sufficiently low, and a high effect of preventing adhesion and deposition of oil sludge is thereby obtained. If the thickness of the metal coating is larger than 10 µm, the effect of preventing adhesion and deposition of oil sludge is obtained. However, the large thickness may result in problems such as an increase in combined tension of the oil ring, an increase in coating formation time, and an increase in material cost. In consideration of the above, the upper limit can be 10 µm. In electroplating, the thickness of a coating can be generally controlled by adjusting plating time and a current value.

An example of surface roughness Ra of the metal coating in the presently disclosed subject matter can be 0.005 µm to 0.4 µm and more preferably 0.005 µm to 0.3 µm. By adjusting the surface roughness of the metal coating within the above range, the fluidity of oil on the surface of the coating is improved, and the function of discharging oil sludge is enhanced. This further improves the effect of preventing adhesion and deposition of oil sludge. To control the surface roughness Ra of the metal coating within the above range, it is desirable to adjust the surface roughness Ra of the members that form the oil ring to 0.005 µm to 0.4 µm and preferably 0.005 µm to 0.3 µm. The surface roughness Ra of the constituent members can be adjusted by polishing. The spacer expander described later is generally produced by gear molding. The surface roughness of the spacer expander may also be controlled by adjusting the surface roughness of the gear.

No particular limitation is imposed on the structure of the oil ring for an internal combustion engine of the presently disclosed subject matter. However, (1) a two-piece oil ring and (2) a three-piece oil ring described below can be used.

(1) Two-Piece Oil Ring (Coil Spring Loaded Oil Control Ring)

FIG. 1 is a cross-sectional view illustrating a part (the right half) of a two-piece oil ring. This oil ring 1 includes an oil ring body 4 and a coil expander 5. The oil ring body 4 includes: a pair of axially spaced upper and lower rail portions 2 each having a land (sliding surface) that slides on the inner wall of a cylinder; and a web 3 that connects the rail portions. The oil ring body 4 has an annular shape having an end gap. An inner peripheral groove 6 is formed on the inner peripheral side of the oil ring body 4, and an outer peripheral groove 8 is formed on the outer peripheral side. Oil drainage passages 7 spaced apart at predetermined intervals are formed in the web 3 and pass radially therethrough. The coil expander 5 is attached to the inner peripheral groove 6 of the oil ring body 4 and presses the main body 4 radially outward.

No particular limitation is imposed on the materials for the oil ring body 4 and the coil expander 5 and on the surface treatment therefor, and known materials and any known surface treatment may be used. For example, any of carbon steel, silicon chromium steel, martensitic stainless steel, spheroidal graphite cast iron, and the like is used as the material for the oil ring body. In particular, martensitic stainless steel subjected to nitriding, and carbon steel and silicon chromium steel coated with a CrN coating by ion plating or a hard chromium plating (the coating is formed on the sliding surface), can be beneficially used because high scuffing resistance can be maintained for a long time. Any of carbon steel, silicon chromium steel, austenitic stainless steel, and the like is used as the material for the coil expander. If necessary, the coil expander may be subjected to chromium plating, nitriding, or other treatment to impart wear resistance thereto.

In the exemplary two-piece oil ring, the metal coating 17 is formed on at least part or all of the oil ring body 4 and the coil expander 5 to achieve the effect of the presently disclosed subject matter. For example, the metal coating may be formed only on the coil expander 5. When the metal coating is formed at least on the surface of the coil expander 5 that faces the inner peripheral groove 6 of the oil ring body 4, the effect of preventing adhesion and deposition of oil sludge can be obtained to a certain extent. The metal coating may be formed on the entire surface of the coil expander 5. In such a case, the effect of preventing adhesion and deposition of oil sludge is obtained also between the pitches of the coil expander 5 and between the coil expander 5 and the inner peripheral groove 6 of the oil ring body 4, and therefore a good oil control function can be maintained for a long time.

In the presently disclosed subject matter, the metal coating may be formed only on the inner peripheral surface of the oil ring body 4. Oil sludge tends to easily adhere to and be deposited on the inner peripheral groove 6 of the oil ring body 4, as well as the coil expander 5. Therefore, by forming the metal coating on the inner peripheral surface of the oil ring body 4, a high effect of preventing adhesion and deposition of the oil sludge is obtained. In this case, it may be beneficial to form the metal coating on the inner peripheral surface of the oil ring body 4 and also on the coil expander 5.

The metal coating may be formed on the entire surface of the oil ring body 4 including the wall surfaces of the oil drainage passages 7, except for the sliding surface. The oil sludge tends to easily adhere also to the wall surfaces of the oil drainage passages 7. Therefore, with the above structure, the effect of preventing adhesion and deposition of the oil sludge is further improved. When the metal coating is formed on the entire surface of the oil ring body 4 and also on the coil expander 5, a better effect is obtained.

(2) Three-Piece Oil Ring (Expander/Segment Oil Control Ring)

FIG. 2 is a cross-sectional view illustrating a part (the right half) of a three-piece oil ring. This oil ring 10 includes: a pair of annular side rails 11 each having an end gap and a spacer expander 12 that supports the side rails 11. Tabs 13 are provided on the inner peripheral side of the spacer expander 12, and outer protruding portions 16 that support the side rails 11 are provided on the outer peripheral side. Flat base dents 14 are provided in sections connecting the tabs 13 and the outer protruding portions 16. After the spacer expander 12 is combined with the side rails 11, spaces 15 surrounded by the tabs 13, the outer protruding portions 16, the base dents 14, and the side rails 11 are formed.

No particular limitation is imposed on the materials for the side rails 11 and the spacer expander 12 and on the surface treatment therefor, and any known materials and any known surface treatment may be used. A material prepared by nitriding austenitic stainless steel such as SUS304 can be used for the spacer expander 12 because the tabs can have good wear resistance. A material prepared by forming, on the outer peripheral surface of a base material such as generally used spring steel, a CrN coating by ion plating or a hard chromium plating, a material prepared by subjecting a base material made of martensitic stainless steel to nitriding, and similar materials are suitable for the side rails 11.

Oil sludge is easily deposited in the spaces 15 formed between the surfaces of the side rails 11 that face the spacer expander 12 and the base dents 14 extending between the tabs 13 and the outer protruding portions 16 of the spacer expander 12. Therefore, by forming a metal coating on the surfaces of the side rails 11 that face the spacer expander 12 or on the upper and lower surfaces of the spacer expander 12, the effect of preventing adhesion and deposition of the oil sludge is obtained. When the metal coating is formed on the entire surfaces of the side rails 11 and the spacer expander 12, i.e., the entire surface of the three-piece oil ring, the effect of preventing adhesion and deposition of the oil sludge is further improved.

EXAMPLES

Hereinafter, the presently disclosed subject matter will be more specifically described by way of Examples, but the presently disclosed subject matter is not limited to the Examples.

Test Example 1

Example 1

A flat plate made of stainless steel (SUS304) was prepared, and the surface of the flat plate was polished such that the surface roughness Ra (center line average roughness) was 0.02 μm±0.01 μm and then degreased in acetone. Then the degreased plate was immersed in a plating bath at 60° C. containing 300 g/L of nickel chloride and 30 g/L of boric acid, and a current was applied at a current density of 10 A/dm$^2$ for 90 seconds to form a Ni plating on the surface. The resultant plate was used as an evaluation specimen. The obtained specimen was measured for surface free energy and hydrogen bonding strength at 60° C. The results are shown in Table 1.

The thickness of the Ni plating was about 0.5 μm, and the surface roughness Ra after the formation of the coating was 0.02 μm.

In this specification, the "surface roughness" is center line average roughness Ra and is a value measured by the following method.

Surface roughness meter: SURFCOM 1400D (product of TOKYO SEIMITSU Co., Ltd.)
JIS standard: JIS B0601-1982
Cut-off value λc: 0.08 mm
Evaluation length (3λc or longer): 0.25 mm Example 2

As in Example 1, the surface of a flat plate made of stainless steel (SUS304) was polished such that the surface roughness Ra was 0.02 μm±0.01 μm and then degreased. The obtained plate was immersed in a plating bath containing 220 g/L of copper sulfate, 60 g/L of sulfuric acid, and 50 mg/L of chlorine ions, and a current was applied at a cathode current density of 3 A/dm$^2$ and an anode current density of 2 A/dm$^2$ for 70 seconds to form a Cu plating on the surface. The resultant plate was used as an evaluation specimen. The surface free energy and hydrogen bonding strength at 60° C. of the obtained specimen were measured as in Example 1. The results are shown in Table 1. The thickness of the Cu plating was about 0.5 μm, and the surface roughness Ra after the formation of the coating was 0.02 μm.

Comparative Example 1

As in Example 1, the surface of a flat plate made of stainless steel (SUS304) was polished such that the surface roughness Ra was 0.02 μm±0.01 μm and then degreased in acetone. The resultant plate was not plated, and a comparison specimen having no coating formed thereon was produced.

Comparative Example 2

As in Example 1, the surface of a flat plate made of stainless steel (SUS304) was polished such that the surface roughness Ra was 0.02 μm±0.01 μm and then degreased in acetone. The degreased plate was placed in a muffle furnace and treated at 550° C. for 30 minutes in a flow of a gas mixture of ammonia and nitrogen at a flow rate of 2 L/min to form a nitride layer on the entire surface of the specimen. The resultant specimen was used as a comparison specimen.

Comparative Example 3

As in Example 1, the surface of a flat plate made of stainless steel (SUS304) was polished such that the surface roughness Ra was 0.02 μm±0.01 μm and then degreased in acetone. Then the degreased plate was immersed in a treatment solution described below, dried at room temperature, and subjected to heat treatment in an electric furnace at 250° C. for 1 hour. A specimen having a fluorine-containing thin-film formed on the flat plate was produced by the above treatment.

The treatment solution was prepared by placing 300 g of tetraethoxysilane, 9 g of heptadecafluoro-1,1,2,2-tetrahydrodecyltriethoxysilane, and 648 g of ethanol in a beaker, stirring the mixture for 20 minutes, adding 123 g of water and 158 g of 0.1N hydrochloric acid, stirring the resultant mixture for 2 hours, and then allowing the mixture to stand at 25° C. for 24 hours in a sealed state.

The surface free energy and hydrogen bonding strength were measured for Comparative Examples 1, 2, and 3 in the same manner as in Example 1. The results are shown in Table 1.

(Oil Sludge Adhesion Test)

Degraded lubricating oil that had been used for operation of an engine and contained oil sludge was used as test oil. The degraded test oil was placed in an oil bath, and the oil temperature was adjusted to 80° C. The temperature inside a vertical electric furnace was set to 190° C. A specimen of which weight was measured in advance was secured to a moving section of a vertical moving mechanism, immersed in the oil bath for 1 minute, pulled out of the oil bath, placed in the electric furnace, and then subjected to heat treatment for 4 minutes. This procedure was defined as one cycle. This cycle of immersion in the oil bath and the heat treatment in the electric furnace was repeated for 35 hours. After completion of the processing, the specimen was removed and washed with acetone. Then the washed specimen was dried in an electric furnace at 120° C. for 1 hour and cooled to room temperature in a desiccator. Then the weight of the specimen was measured. The amount of the oil sludge adhering to the specimen was determined from the difference before and after the oil sludge adhesion test. The amount of the oil sludge adhering to a specimen treated for 100 hours was also measured. The results of the oil sludge adhesion test for each of the specimens are shown in Table 1. The amount of the oil sludge adhering to a specimen is represented as a relative value when the amount per unit area of the oil sludge adhering to the specimen of Comparative Example 1 after the 35-hour test is set to 100.

In Comparative Example 1 in which no coating was formed, the surface free energy and also the hydrogen bonding strength were high, and a large amount of the oil sludge was found to adhere to substantially the entire surface after 35 hours. After 100 hours, the amount of the adhering oil sludge further increased. In Comparative Example 2 in which gas nitriding was performed, the surface free energy and the hydrogen bonding strength were larger than those in Comparative Example 1, and the amount of the adhering oil sludge was also larger. In Comparative Example 3 in which the specimen was coated with the fluorine-containing coating, the surface free energy and the hydrogen bonding strength were smaller than those in Comparative Examples 1 and 2, and the amount of the adhering oil sludge after 35 hours was significantly smaller. However, when the test was continued, a large amount of the oil sludge, although less than those in Comparative Examples 1 and 2, was found to adhere after 100 hours. This may be because the fluorine-containing coating was thermally decomposed with the lapse of time and therefore the effect of preventing adhesion and deposition was significantly reduced.

In Example 1 in which the specimen was coated with the Ni plating, the surface free energy was about 30 mJ/m$^2$, which was higher than that in Comparative Example 3 but lower than those in Comparative Examples 1 and 2, and the hydrogen bonding strength was 0.0 mJ/m$^2$, which was the same as that in Comparative Example 3. The amount of the adhering oil sludge in Example 1 after 35 hours was lower than that in Comparative Example 3, and the amount of the adhering oil sludge after 100 hours was still low. This showed that the effect of preventing adhesion and deposition was maintained. In Example 2 in which the specimen was coated with the Cu plating, the surface free energy was lower than that in Example 1, and the amounts of the adhering oil sludge after 35 hours and 100 hours were lower than those in Example 1. This may be because the coatings used in the examples of the presently disclosed subject matter were metal coatings and had high heat resistance. Therefore, a high effect of preventing adhesion and deposition of oil sludge was maintained for a long time.

TABLE 1

| No. | Surface Free Energy (60° C.)/ mJ/m² | Hydrogen Bonding Strength (60° C.)/mJ/m² | Amount of Adhering Oil Sludge After 35 hr | Amount of Adhering Oil Sludge After 100 hr |
|---|---|---|---|---|
| Example 1 | 31.1 | 0.0 | 6.4 | 26.3 |
| Example 2 | 22.5 | 0.0 | 5.6 | 20.7 |
| Comparative Example 1 | 59.8 | 1.6 | 100 | 325 |
| Comparative Example 2 | 70.6 | 2.1 | 140 | 495 |
| Comparative Example 3 | 17.0 | 0.0 | 29.8 | 285 |

Test Example 2

Examples 3 to 5 and Comparative Example 4

The surfaces of flat plates made of stainless steel (SUS304) were polished such that the surface roughness Ra was 0.1 µm (Example 3), 0.3 µm (Example 4), 0.35 µm (Example 5), and 0.45 µm (Comparative Example 4) and then degreased in acetone. Each degreased plate was immersed in a plating bath similar to that used in Example 1 to form a Ni plating under the conditions similar to those in Example 1, and the coated plate was used as an evaluation specimen. The metal coating on each specimen was measured for surface roughness Ra, surface free energy at 60° C., and hydrogen bonding strength at 60° C. The results are shown in Table 2. The thickness of the Ni plating was about 0.5 µm. As in Example 1, the amount of the adhering oil sludge after 35 hours was determined, and the results are also shown in Table 2.

TABLE 2

| No. | Surface roughness of Ni plating µm | Surface Free Energy (60° C.) mJ/m² | Hydrogen Bonding Strength (60° C.) mJ/m² | Amount of Adhering Oil Sludge (After 35 hr) |
|---|---|---|---|---|
| Example 1 | 0.02 | 31.1 | 0.0 | 6.4 |
| Example 3 | 0.12 | 33.6 | 0.0 | 6.8 |
| Example 4 | 0.28 | 35.4 | 0.2 | 8.5 |
| Example 5 | 0.35 | 38.9 | 0.3 | 9.4 |
| Comparative Example 4 | 0.44 | 51.5 | 1.2 | 31.9 |

It was found that, when a coating had a surface free energy at 60° C. of 40 mJ/m² or less and a hydrogen bonding strength at 60° C. of 1.0 mJ/m² or less, which were the ranges defined in the present example, a high effect of preventing adhesion and deposition of the oil sludge was obtained (Examples 1 and 3 to 5). However, in the coating in which the surface free energy and the hydrogen bonding strength were outside the above ranges (Comparative Example 4), the amount of the adhering oil sludge significantly increased. In Examples 1 and 3 to 5, the smaller the surface roughness of the coating, the better the obtained effect of preventing adhesion and deposition of the oil sludge.

Test Example 3

Examples 6 to 11 and Comparative Examples 5 and 6

As in Example 1, the surfaces of flat plates made of stainless steel (SUS304) were polished such that the surface roughness Ra was 0.02 µm±0.01 µm and then degreased in acetone. Then each degreased plate was immersed in a plating bath similar to that used in Example 1 to form a Ni plating. During plating, a current value and the plating time were controlled such that the thickness of the formed Ni plating was 0.01 µm (Comparative Example 5), 0.05 µm (Comparative Example 6), 0.1 µm (Example 6), 0.5 µm (Example 7), 1.0 µm (Example 8), 5.0 µm (Example 9), 8.0 µm (Example 10), and 10 µm (Example 11). Each plated plate was used as an evaluation specimen. The thickness of the metal coating, the surface free energy at 60° C., and the hydrogen bonding strength at 60° C. of each specimen were measured, and the results are shown in Table 3. The surface roughness of each Ni plating was about 0.02 µm. The amount of the adhering oil sludge after 35 hours was determined as in Example 1, and the results are also shown in Table 3.

TABLE 3

| No. | Thickness of Ni plating µm | Surface Free Energy (60° C.) mJ/m² | Hydrogen Bonding Strength (60° C.) mJ/m² | Amount of Adhering Oil Sludge (After 35 hr) |
|---|---|---|---|---|
| Comparative Example 5 | 0.01 | 60.3 | 2.2 | 36.1 |
| Comparative Example 6 | 0.05 | 49.7 | 1.6 | 22.3 |
| Example 6 | 0.1 | 36.9 | 0.3 | 6.6 |
| Example 7 | 0.5 | 31.0 | 0.0 | 6.1 |
| Example 8 | 1.0 | 32.0 | 0.0 | 5.6 |
| Example 9 | 5.2 | 34.8 | 0.0 | 2.5 |
| Example 10 | 8.1 | 35.5 | 0.0 | 2.9 |
| Example 11 | 10 | 33.9 | 0.0 | 5.1 |

It was found that, when a coating had a surface free energy at 60° C. of 40 mJ/m² or less and a hydrogen bonding strength at 60° C. of 1.0 mJ/m² or less, which were the ranges defined in the present example, a high effect of preventing adhesion and deposition of the oil sludge was obtained (Examples 6 to 11). However, in the coatings in which the surface free energy and the hydrogen bonding strength were outside the above ranges (Comparative Examples 5 and 6), the amount of the adhering oil sludge significantly increased.

Test Example 4

The components of three-piece oil rings (see FIG. 2) were produced by the following method and assembled together. The obtained oil rings were attached to an internal combustion engine, and the effect of preventing adhesion and deposition of oil sludge was evaluated.

Example 12

(1) Production of Side Rails

A wire of 17Cr martensitic stainless steel of which surface roughness had been adjusted was plated with Ni using a wire plating apparatus while the wire was wound at a winding speed of 3 m/min. A nickel sulfamate bath was used as a plating bath. The thickness of the obtained plating was about 2 µm. The surface free energy at 60° C. was 37 mJ/m², and the hydrogen bonding strength at 60° C. was 0.3 mJ/m². The processed wire was shaped into a perfect circle, and its outer surface was coated with a chromium nitride coating by ion plating. Then the shaped wire was cut to form a side rail.

(2) Production of Spacer Expander

A rolled strip (made of SUS304) for a spacer expander that had a width of 2.3 mm, a thickness of 0.3 mm, and an R-shaped edge was gear-molded into a vertical wavy shape. Then tabs were formed at one end of the molded wire by vertical shearing, and the resultant wire was shaped into a ring shape with the tabs on the inner peripheral side and was then cut to form the spacer expander.

(3) Production of Three-Piece Oil Ring

The produced side rails and spacer expander were combined to form a three-piece oil ring. The nominal diameter (d1) of the ring was 71 mm, the combined nominal width (h1) was 1.5 mm, the combined thickness (a1) was 1.9 mm, and the tension was 8.1N.

Example 13

(1) Production of Side Rails

Side rails were produced as in Example 12.

(2) Production of Spacer Expander

A rolled strip (made of SUS304) for a spacer expander that had a width of 2.3 mm, a thickness of 0.3 mm, and an R-shaped edge was plated with Ni using a wire plating apparatus while the wire was wound at a winding speed of 3 m/min. A nickel sulfamate bath was used as a plating bath. The thickness of the obtained Ni plating was about 5 μm. The surface free energy at 60° C. was 38 mJ/m², and the hydrogen bonding strength at 60° C. was 0.4 mJ/m².

The processed wire was gear-molded into a vertical wavy shape. Then tabs were formed at one end of the molded wire by vertical shearing, and the resultant wire was shaped into a ring shape with the tabs on the inner peripheral side and was then cut to form a spacer expander.

(3) Production of Three-Piece Oil Ring

The produced side rails and spacer expander were combined is to form a three-piece oil ring. The nominal diameter (d1) of the ring was 71 mm, the combined nominal width (h1) was 1.5 mm, the combined thickness (a1) was 1.9 mm, and the tension was 8.0 N.

Comparative Example 7

Side rails and a spacer expander that were produced as in Example 12 except that the side rails were not plated with Ni were combined to form a three-piece oil ring. The values of d1, h1, and a1 were the same as those in Example 12, and the tension was 8.1 N.

(Test on Real Engine)

The three-piece oil rings obtained in Examples 12 and 13 and Comparative Example 7 were attached to first to third cylinders of a 1-L three cylinder engine. A test in which patterned operation was repeated was performed on the above real engine. After 250 hours, predetermined evaluation items were evaluated according to the following evaluation methods. The test on the real engine was repeated a total of three times under the same operating conditions with the oil rings of Examples 12 and 13 and Comparative Example 7 attached to different cylinders. Top rings and second rings having the following specifications were used.

a. Top Rings
   Material: SWOSC-V, the outer peripheral surface was ion-plated with chromium nitride
   Dimensions: d1=71 mm, h1=1.0 mm, a1=2.3 mm b. Second Rings
   Material: SWOSC-V, the entire surface was treated with zinc phosphate
   Dimensions: d1=71 mm, h1=1.0 mm, a1=2.3 mm (4) Evaluation Methods After completion of each test on the real engine, the following evaluations were performed.

a. Measurement of Free Gap Size of Side Rails

After completion of each test on the real engine, the pistons were pulled out of the cylinders, and the size ($f_2$) of the free gap of each of the upper and lower side rails of each three-piece oil ring was measured, and the ratio of $f_2$ to the size $f_2$ of the free gap of each of the side rails attached to the pistons before the test on the real engine (the ratio ($f_2/f_1$)) was determined. $f_2/f_2$ was determined for each of the upper and lower side rails, and the average value for the three repetitions of the test on the real engine was determined.

b. Measurement of Amount of Adhering Oil Sludge

The mass of each oil ring just after the operation was measured, and the difference from the mass of the oil ring measured before attachment was computed. The average value for the three repetitions of the test on the real engine was used as the amount of the adhering oil sludge.

(5) Evaluation Results

FIGS. 3 and 4 show the size of the free gap and the amount of the adhering oil sludge after the test on the real engine for each of Examples 12 and 13 and Comparative Example 7. The size of the free gap after test is a relative value when $f_2/f_2$ in Comparative Example 7 is set to 100, and the amount of the adhering oil sludge is a relative value when the amount of the adhering carbon sludge in Comparative Example 7 is set to 100.

As can be seen from FIG. 3, the size of the free gap in Example 12 after the test on the real engine was about 1.5 times larger than that in Comparative Example 7. This may be because, in Comparative Example 7 in which Ni plating was not performed, the deposition of the oil sludge constrained the side rails to move. Therefore, even after the piston was pulled out of the cylinder, the end gap did not easily return to the original state (the end gap was not easily widened). However, in Example 12 in which the side rails were plated with Ni, the amount of adhering and deposited oil sludge was lower, and therefore the degree of constraint on the oil ring was lower. Therefore, as compared to the state in Comparative Example 7, the state of the widened end gap was closer to the state before the operation. In Example 13 in which the side rails and also the spacer expander were plated with Ni, the size of the free gap after test was further increased than in Example 12 and was closer to the original size, and it was found that the effect of preventing adhesion and deposition of the oil sludge was further improved.

As can be seen from FIG. 4, the amounts of the adhering oil sludge in Examples 12 and 13 were reduced by about 50% and about 30% as compared to that in Comparative Example 7, respectively. It was found that the Ni plating provided the effect of preventing adhesion and deposition of the oil sludge.

Figure 1:
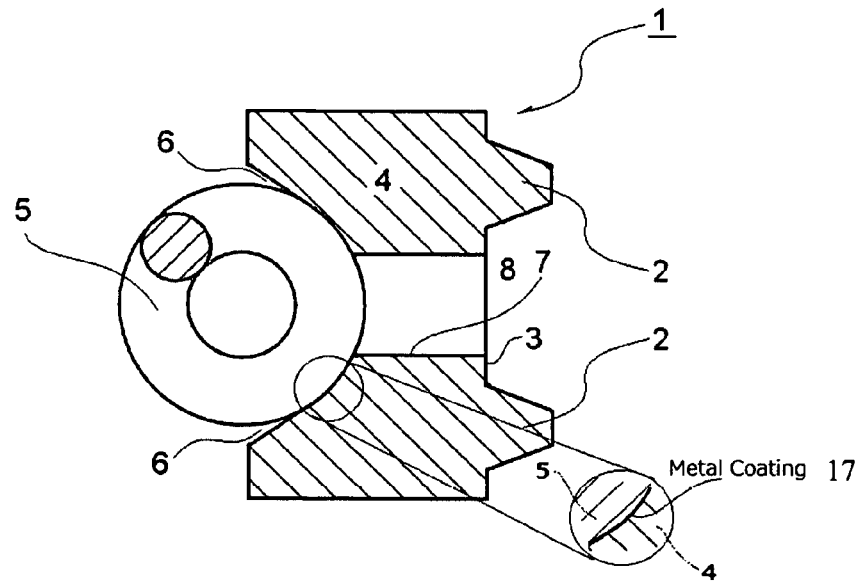
FIG. 1 is a cross-sectional view illustrating a part (the right half) of an example of a coil spring loaded oil control ring (a two-piece oil ring).
Figure 2:
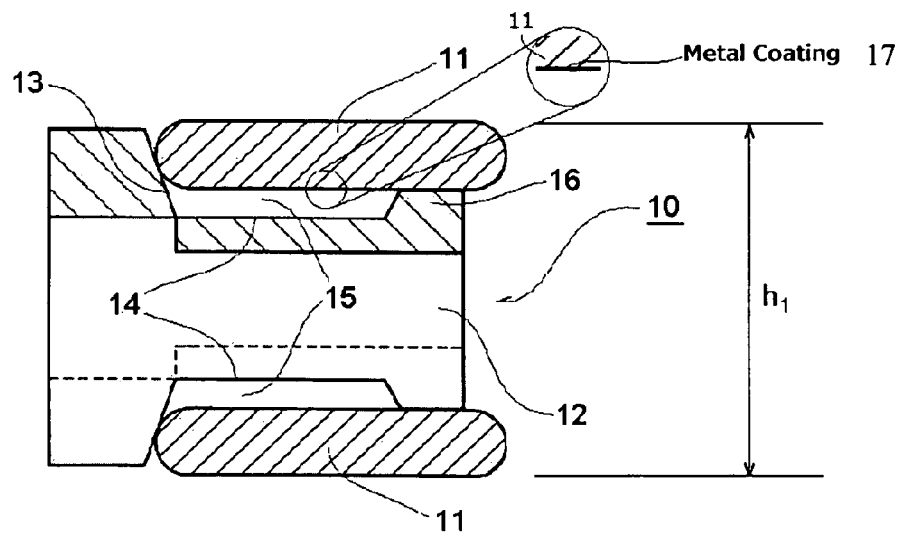
FIG. 2 is a cross-sectional view illustrating a part (the right half) of an example of an expander/segment oil control ring (a three-piece oil ring).
Figure 3:
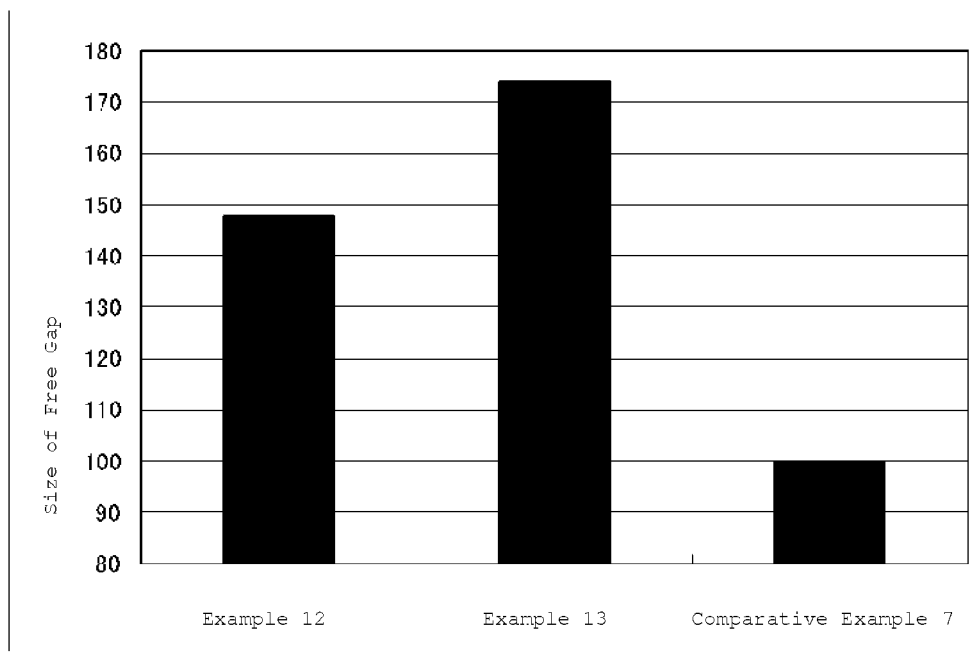
FIG. 3 is a graph showing a change in size of the free gaps of side rails before and after a test on a real engine (a relative value when the change in Comparative Example 7 is set to 100).
Figure 4:
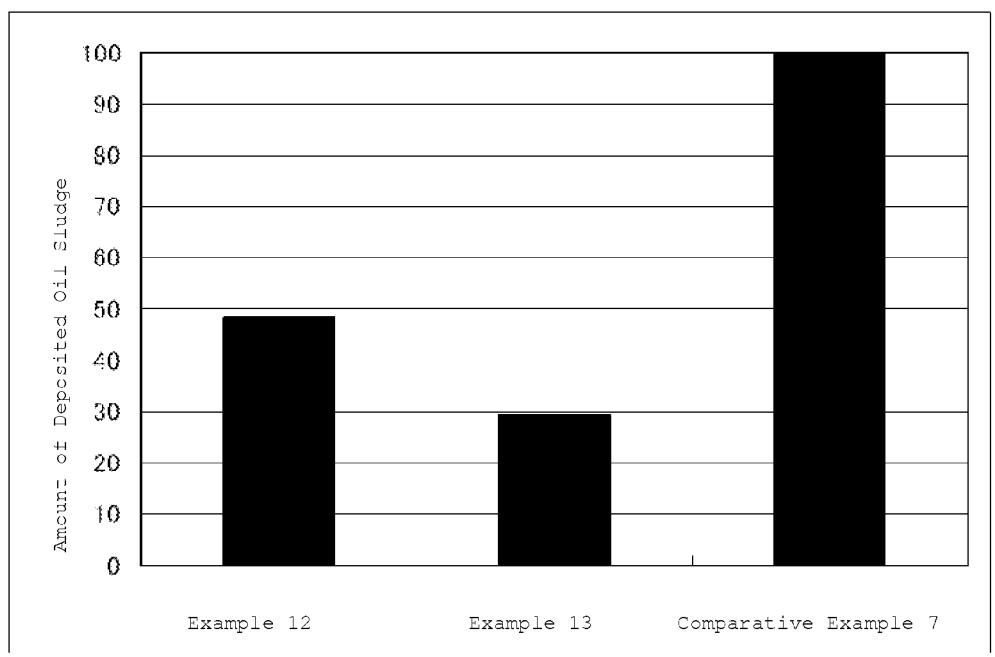
FIG. 4 is a graph showing the amount of oil sludge adhering to an oil ring after the test on the real engine (a relative value when the amount in Comparative Example 7 is set to 100).

DESCRIPTION OF REFERENCE NUMERALS 1 coil spring loaded oil control ring (two-piece oil ring)
2 rail portion
3 web
4 oil ring body
5 coil expander
6 inner peripheral groove
7 oil drainage passage
8 outer peripheral groove
10 expander/segment oil control ring (three-piece oil ring)
11 side rail
12 spacer expander
13 tab
14 base dent
15 space
16 outer protruding portion
$h_1$ axial width

The invention claimed is:

1. An oil ring for an internal combustion engine in which at least part of a surface of the oil ring has a surface roughness Ra of 0.005 μm to 0.4 μm and is coated with a metal coating having a thickness of 0.1 to 10 μm, wherein:
the metal coating has a surface roughness Ra of the metal coating within a range of 0.005 μm to 0.4 μm;
a surface of the metal coating has a surface free energy at 60° C. of 40 mJ/m$^2$ or less and a hydrogen bonding strength at 60° C. of 1.0 mJ/m$^2$ or less;
the metal coating contains a material selected from the group consisting of Ni, Cu, and alloys containing one of Ni and Cu;
the oil ring for an internal combustion engine comprises an oil ring body that includes a pair of axially disposed upper and lower rail portions and a web connecting the rail portions, the oil ring body having an end gap, and a coil expander that is attached to an inner peripheral groove of the oil ring body; and
the oil ring for an internal combustion engine comprises a spacer expander, and a pair of upper and lower side rails supported by the spacer expander.

* * * * *